April 14, 1959  H. M. PIKER  2,881,936
INSULATED CONTAINER
Filed March 31, 1955  3 Sheets-Sheet 1

INVENTOR.
HERBERT M. PIKER
BY
Joseph A. Rave
Attorney

April 14, 1959  H. M. PIKER  2,881,936
INSULATED CONTAINER
Filed March 31, 1955  3 Sheets-Sheet 2

INVENTOR.
HERBERT M. PIKER
BY
Joseph A. Rave
Attorney

April 14, 1959   H. M. PIKER   2,881,936
INSULATED CONTAINER
Filed March 31, 1955   3 Sheets-Sheet 3
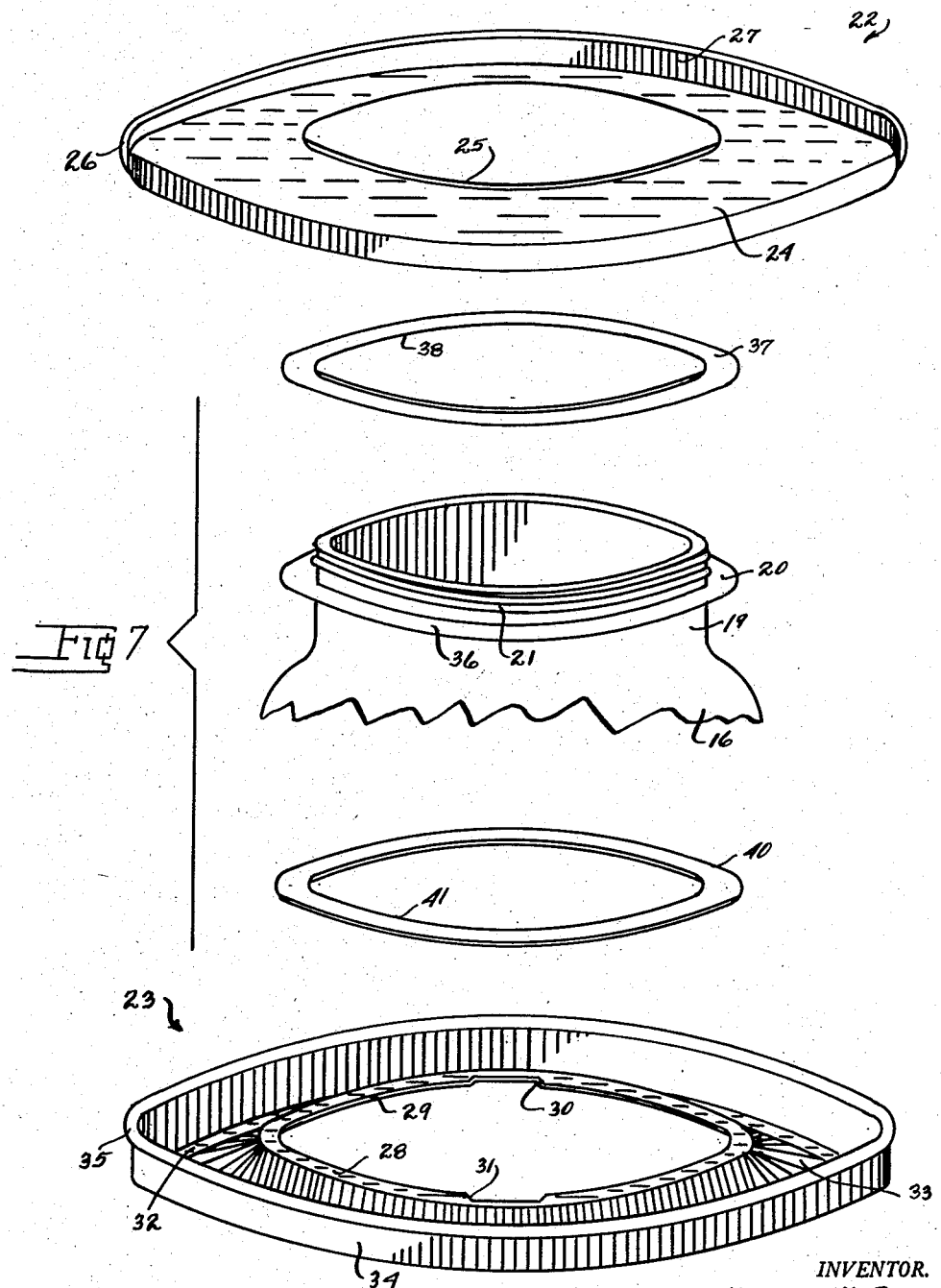
INVENTOR.
HERBERT M. PIKER
BY
Joseph A. Rave
Attorney

United States Patent Office 2,881,936
Patented Apr. 14, 1959

2,881,936

INSULATED CONTAINER

Herbert M. Piker, Wyoming, Ohio, assignor to Hamilton-Skotch Corporation, a corporation of Ohio Application March 31, 1955, Serial No. 498,358

9 Claims. (Cl. 215—13)

This invention relates to improvements in an insulated container and particularly to such a container for use as a "jug" for transporting and maintaining liquids in hot and cold condition for a reasonable period of time.

The container of the present invention is popularly known and generally referred to as a "picnic jug" and is generally employed for hot or cold drinks.

The principal object of the present invention is the provision of an insulated container that is mechanically sound and will withstand the usual tough treatment given to containers of the kind of the present invention.

Another object of the invention is the provision of a particularly ingenious method of mounting or suspending the inner member, generally, a glass jar or bottle, within the outer shell so that the parts may be readily and economically assembled and which parts together form or constitute the "jug."

Another object of this invention is the provision of a jug that will accomplish the foregoing object and in which the said inner member, glass jar or bottle, is completely insulated from its suspending means and enclosing shell whereby no shocks to the shell are transmitted to the same.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 7 is a perspective view of the several elements utilized in the mounting or suspension of the glass inner container of the insulated jug.

Throughout the several views of the drawings similar reference characters are employed to denote the same or similar parts.

Figures 1, 3, 4:
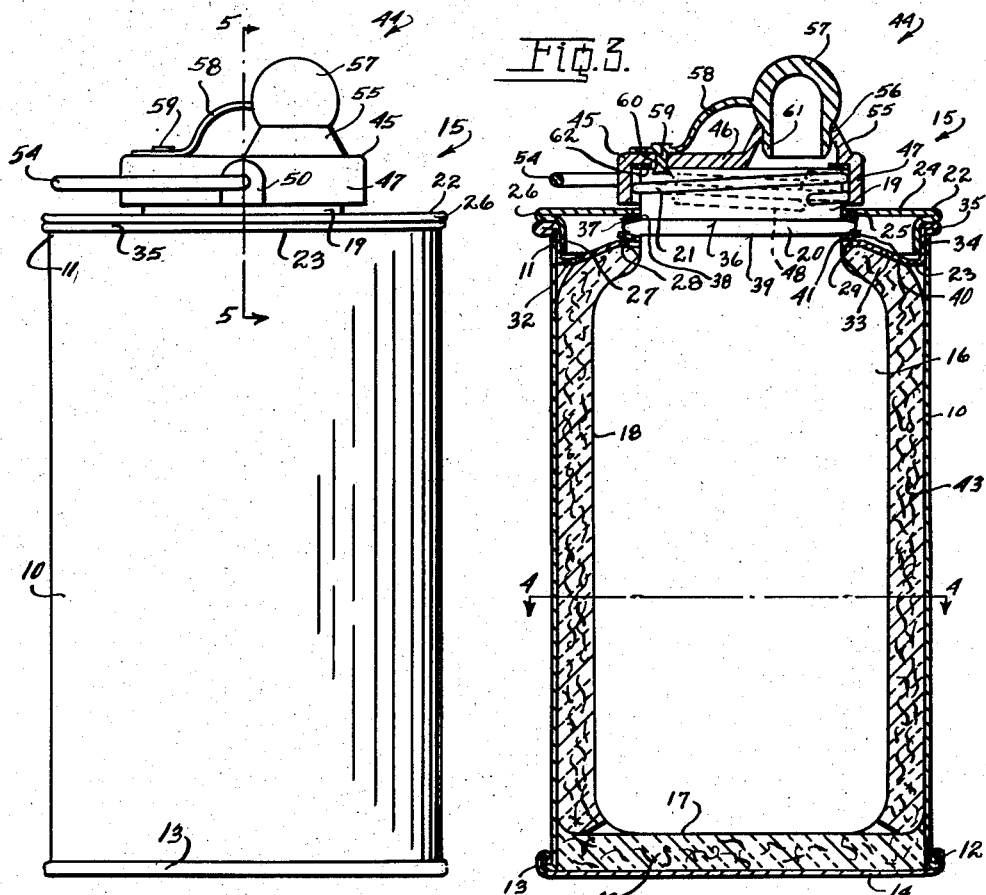
Fig. 1 is an elevational view of the insulated container of the present invention.
Fig. 3 is a vertical sectional view of the insulated container as seen from line 3—3 on Fig. 2.
Fig. 4 is a transverse sectional view through the insulated container as seen from line 4—4 on Fig. 3.
Figure 2:
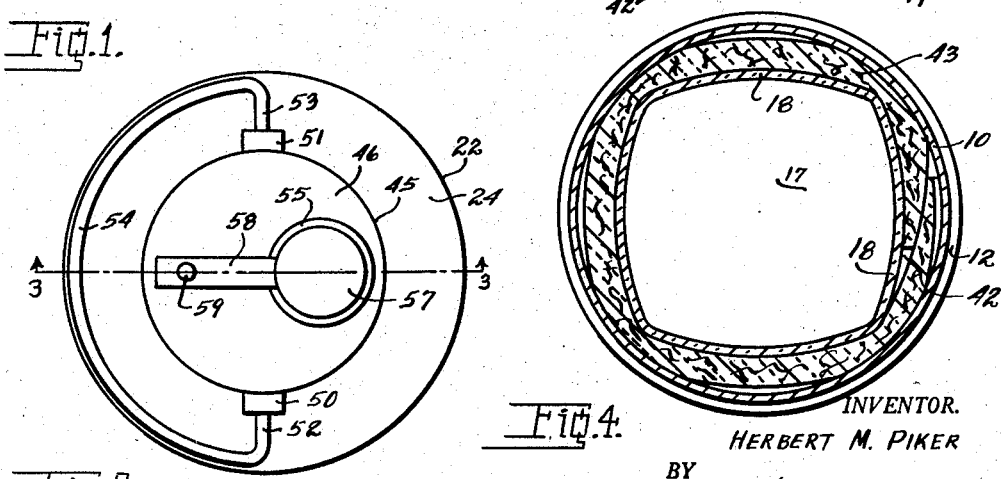
Fig. 2 is a top plan view of the container of Fig. 1.

The insulated container of the present invention comprises an outer body member or shell 10 in the form of a hollow cylinder having its upper end open as at 11. The lower end of the body member 10 is outwardly turned to form a hook 12 adapted to interfit with a complementary hook 13 formed at the periphery of the container bottom 14. The bottom 14 is attached to the shell 10 in the same manner as the end closures for a can.

The upper end 11 of the shell 10 is closed by an inner container suspending mechanism indicated in general by the reference numeral 15.

The inner container 16 is in the form of a glass bottle or jar, such as is well known as a "Mason Fruit Jar." Such a jar is provided with a bottom 17 from the periphery of which upstands the wall 18 and the said bottom may be circular in plan but is preferably, and as illustrated in Fig. 4, substantially rectangular in plan and has a wall 18 upstanding from each side or edge thereof.

The said inner container or jar 16 terminates at its upper end in a neck 19 having a radial flange 20 at its lower end. Upwardly of the radial flange 20 the neck 19 is provided with an outwardly projecting spiral rib which forms in effect a screw thread 21.

In the mounting of the inner container or jar 16 within the shell 10, use is made of the radial flange 20 for attaching the said inner container or jar 16 to the suspending device 15.

Specifically, the suspending device 15 comprises a pair of telescopic clamping members, an upper member 22 and a lower member 23 with said upper member 22 comprising a substantially horizontal portion 24 centrally apertured as at 25. The aperture 25 has an inner diameter substantially equal to the diameter of the spiral rib or thread 21 so as to just pass thereover. The periphery of the body portion 24 is turned on itself to form a bead 26 whereupon said periphery is downwardly disposed as a skirt 27 and through which the said upper member 22 is telescoped with the lower member 23.

The said lower clamping member 23 is, generally, dish shaped and comprises a body portion having an upper horizontal portion 28 centrally apertured, as at 29, with said aperture having diameter somewhat less than the diameter of the inner container or jar radial flange 20. At two diametrically opposite points of the aperture 29 the said body portion, in effect a ring, 28 is inwardly notched as at 30 and 31 so that its transverse dimension, between the bases of said notches 30 and 31, will be such that the inner container radial flange may be passed through the aperture 29 to have its body portion ring 28 therebelow, as will presently be made clear. The said lower clamping member 23 has a further ring like portion 32 that is downwardly spaced from the body portion ring 28 as clearly illustrated in Figs. 3 and 5. The lower clamping member 23 has the intermediate portion of its body portion downwardly inclined as at 33 for connecting the spaced horizontal ring like body portions 28 and 32 with one another.

The outer periphery of the body portion ring 32 is upwardly turned as at 34 to form a flange or wall of the dish and has an inner diameter to frictionally and closely receive the downwardly disposed flange 27 of the top clamping member 22. The upper end of the flange or wall 34 is turned on itself to provide a bead 35 adapted to contact and underlie the upper clamping member bead 26 as clearly illustrated in Fig. 3.

Figure 5:
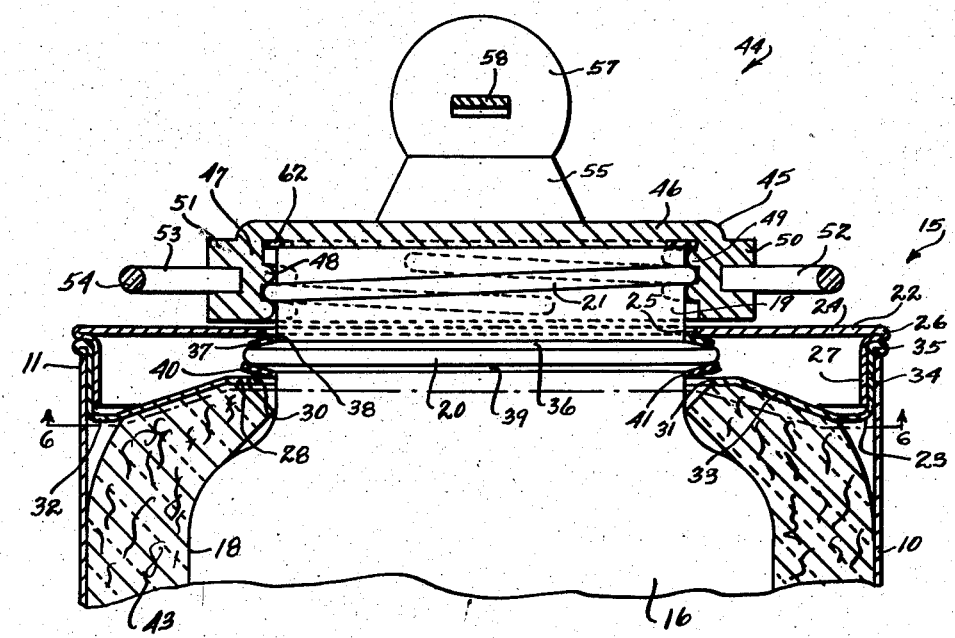
Fig. 5 is an enlarged fragmentary section view illustrating, in particular, the suspending means for the inner container as seen from line 5—5 on Fig. 1.
Figure 6:
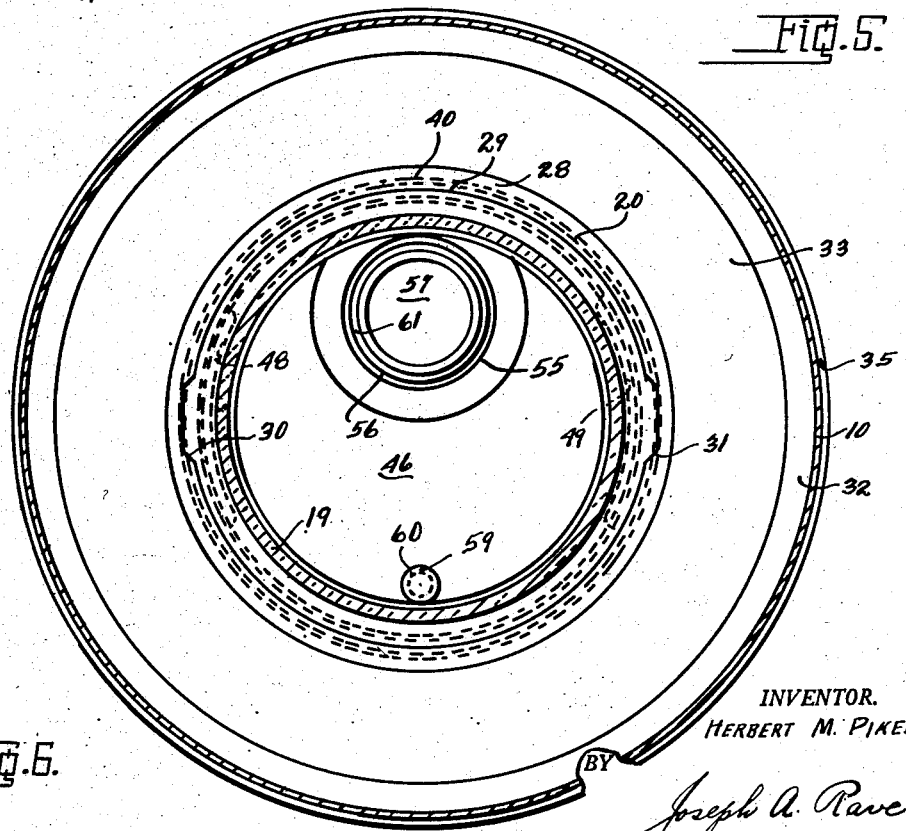
Fig. 6 is an inverted transverse view showing certain parts in elevation and certain parts in cross section as seen from line 6—6 on Fig. 5.

Disposed on the upper face 36 of the inner container radial flange 20 is a rubber washer or gasket 37 having a diameter 38 equal, substantially, to the diameter of the container neck 19, see Fig. 7, so as to closely engage said neck when lying on the face 36 of the radial flange 20; since the said washer or gasket 37 is formed of flexible material, rubber, it can be stretched over the spiral rib or thread 21 to be disposed as illustrated in Figs. 3 and 5. Lying against the under surface 39 of the inner container radial flange 20 is a second gasket or washer 40, similar to the gasket or washer 37, formed of rubber and having an aperture 41, see Fig. 7, again of a diameter substantially equal to the diameter of the inner container neck 19 and, again, since the gasket 40 is formed of flexible rubber, is stretchable to pass over the inner container radial flange 20 to be disposed thereneath and against its said under surface 39.

It should be noted that the exterior diameter of the upstanding flange 34 of the lower clamping member of the suspending means is such that it tightly and frictionally enters the open upper end of the outer shell 10.

In assembling the insulated container, the said inner container first has the lower clamping member 23 mounted in operative position by having inserted through its aperature the inner container radial flange 20, this being accomplished, as noted above, by angularly positioning the said member on the inner container neck and with the radial flange 20 thereon pushed through the notches 30 and 31 whereupon the said clamping member 23 may be straightened up and temporarily retained on the flaring portion of said inner container that is located below its neck 19. The lower gasket or washer 40 is now mounted in position to underlie the said inner container radial flange 20 and be disposed against the lower surface 39 thereof. The upper gasket 37 is now mounted in position to lie on top of the said inner container radial flange 20 and hug the upper surface 37 of the flange 20. The suspending means top clamping member 22 now has the inner container neck inserted through its aperture 25 whereupon the said inner and outer clamping members 22 and 23 are telescoped by inserting the depending flange 27 of the upper member within the upstanding flange 34 of the lower member and said parts telescoped until their respective outwardly projecting beads, 26 and 35, are in face contact, as illustrated in Figs. 3 and 5. It should be noted that the frictional engagement of these parts is such that an instrument or tool is necessary to be inserted between said beads 26 and 35 in order to separate the parts after they have been operatively associated with one another.

It should further be noted that the telescoping of the suspending means upper and lower clamping members to the point of bead engagement effects a tight clamping engagement of the portion of the upper member body 24 that is immediately outwardly of its aperture 25 on the upper gasket 37 and that a similar clamping action is effected through the inner body portion ring 28 of the lower clamping member with the lower gasket 40, all as clearly illustrated in Figs. 3 and 5. The clamping engagement of these parts is such that said upper and lower gaskets 37 and 40 are compressed to form a liquid and air tight joint around the inner container neck.

It will now be noted that the inner container is securely attached to the suspending mechanism and the said parts are inserted as a unit within the outer container. Before the insertion, however, of the inner container within the shell 10 a layer of heat insulation, for example, in the nature of sheet spun glass, 42 is first deposited within the shell 10 against the inner face of the bottom 14. The inner container or glass jar 16 is then completely wrapped or enfolded in a sheet 43 of similar heat insulating material whereupon the said inner container is inserted within the outer container or shell 10.

The connection of the parts with one another is by the frictional insertion of the inner container suspending means flange 34 within the open upper end 11 of the said shell 10. It should be noted that considerable force is necessary to insert the said lower member 23 within the shell 10, such frictional resistance exists between the suspending device and outer shell that the use of a tool or instrument is needed for subsequently separating the parts when desired.

The parts are so related to one another that upon the insertion of the inner member suspending device to the point where its radial flange or bead 35 engages the upper end 11 of the shell 10 the insulating material 42 and 43 is in contact with the parts and under a slight compression.

It will be understood that the members are separable from one another only when it is necessary for the cleaning of the interior of the shell and the exterior of the inner container or when it is necessary to replace said inner container due to breakage thereof.

It will be readily understood that the inner container 16 has its neck centrally apertured for the filling and discharging thereof and which aperture is closed by a readily removable closure cap, indicated in its entirety by the reference numeral 44. This closure cap is clearly disclosed in applicant's pending application, Serial Number 462,925 filed October 18, 1954 but briefly is as follows:

The closure cap 45, per se, comprises a body portion 46 with a depending flange 47 from its periphery. Inwardly projecting from diametrically opposite points are ribs 48 and 49 which, as seen in Fig. 3, for ribs 48, incline to the horizontal and in fact incline to the same degree as the spiral rib or thread 21 on the container neck 19. The said ribs 48 and 49 are in fact interrupted threads for threaded engagement with the, as noted above, threads of the inner container neck.

The closure cap has lugs 50 and 51, respectively, projecting from two diametrically opposite points on the exterior of its flange 47, each of which is provided with a socket for respectively receiving the inwardly projecting ends 52 and 53 of a bail handle 54.

In practice the closure cap 44 is removed to permit filling of the inner container through its neck 19 and since the said contents are to be discharged in relatively small quantities as compared to its capacity, the said closure cap is provided with a discharge opening. The discharge opening may be formed as part of a funnel-like upstanding lug 55 which is centrally apertured as at 56 to receive a removable cork, stopper, or the like 57. The said stopper 57 is illustrated as having integrally formed therewtih a tie or leash 58 having at its other end a plug 59 through which the said cork is attached to the closure cap body portion 46. The attachment of the tie or leash 58 to the closure cap being effected by inserting the said lug 59 through an aperture 60 in the closure cap body 38.

In practice the container outer body 10, inner container upper and lower clamping members 22 and 23 and bottom 14 are formed of sheet metal, although they may be formed of other material whether moldable or formable by other means. The inner container 16 is preferably formed of glass, as noted above, a well known "Mason Fruit Jar," or the like and can thereby be readily cleaned and kept clean and sanitary. The closure cap 45 may be made of a moldable synthetic resin compound commonly known as plastic and preferably of the type that is hard and rigid after molding, while the stopper 57, its tie or leash 58, and the securing lug 60 are likewise formed of moldable synthetic resin, but preferably of the type that remains flexible and slightly compressible after formation, so that said stopper may have its reduced end 61 readily pressed into the discharge opening 56. The flexible tie or leash 58 permits the ready withdrawal of the stopper from the discharge opening and permits the ready insertion of said stopper into said opening while the flexible lug 59 permits pressing of the same through its attaching aperture 60 in the closure cap body.

It will be readily noted from the drawings that the screwing of the closure cap 45 through its interrupted threads 48 and 49 onto the outer container neck is continued until the gasket 62, carried by the under or inner surface of the closure cap body portion 46, is compressed or clamped between the upper edge of the inner container neck and the under surface of the closure cap body 46.

The insulated container of the present invention, as will be readily noted from the foregoing, comprises a metallic or outer sheath centrally of which is suspended a relatively fragile inner container and which inner container is protected against shock from abuse to the outer container through suitable insulating material which not only absorbs shock but at the same time insulates the inner container from transfer of heat through contact of said inner container with the outer container.

In view of the foregoing, it will be further noted that the objects initially set forth have otherwise been fulfilled.

What is claimed is:

1. In an insulated container the combination of an outer container having a body portion with its upper end open and its lower end closed, an inner container having a bottom, an upstanding wall from said bottom and a centrally apertured neck portion above the body portion, said inner container having an integral radial flange on the neck portion upwardly of its body portion, a pair of telescopic clamping members each including a body portion centrally apertured to a dimension to permit passage therethrough of the inner container neck and respectively overlying and underlying the inner container radial flange radially outwardly of its neck and releasably clampingly connecting the said inner container radial flange and the said clamping members to one another with said clamping member underlying the radial flange having its central aperture in one direction of such a dimension to permit the radial flange to initially pass therethrough and said members including means for releasable connection with the open upper end of the outer container.

2. In an insulated container the combination of an outer container having a body portion with its upper end open and its lower end closed, an inner container having a bottom, an upstanding wall from said bottom and a centrally apertured neck portion above the body portion, said inner container having an integral radial flange on the neck portion upwardly of its body portion, a pair of telescopic clamping members each including a body portion centrally apertured to a dimension to permit passage therethrough of the inner container neck and respectively overlying and underlying the inner container radial flange radially outwardly of its neck and releasably clampingly connecting the said inner container radial flange and the said clamping members to one another with said clamping member underlying the radial flange having its central aperture in one direction of such a dimension to permit the radial flange to initially pass therethrough, said members including means for releasable connection with the open upper end of the outer container, and a resilient compressible washer between the radial flange and each of the clamping body portions of the upper and lower clamping members.

3. In an insulated container the combination of an outer container having a body portion with its upper end open and its lower end closed, an inner container having a bottom, an upstanding wall from said bottom and a centrally apertured neck portion above the body portion, said inner container having an integral radial flange on the neck portion upwardly of its body portion, a pair of telescopic clamping members each including a body portion centrally apertured to a dimension to permit passage therethrough of the inner container neck and respectively overlying and underlying the inner container radial flange radially outwardly of its neck and releasably clampingly connecting the said inner container radial flange and the said clamping members to one another with said clamping member underlying the radial flange having its central aperture in one direction of such a dimension to permit the radial flange to initially pass therethrough, said clamping members including means for releasable connection with the open upper end of the outer container, a resilient compressible washer between the radial flange and each of the clamping body portions of the upper and lower clamping members, said inner container having its neck upwardly of the upper clamping member, and an apertured closure cap for said neck.

4. A suspending device for the inner container of an insulated container and wherein said inner container is centrally suspended within an outer container, the combination with said inner container having a centrally aperture neck with an integral radial flange radially outwardly of said inner container neck, of an upper and a lower clamping member adapted to be telescoped relative to one another and each including a body portion extending in parallelism centrally apertured to have extended therethrough the said inner container neck, said lower clamping members central aperture in one direction having a dimension to permit the radial flange to initially pass therethrough, and said clamping members body portions respectively above and below the neck radial flange clamping the same upon the telescoping thereof, and means associated with said telescoping members for attaching the same to the outer container for suspending the inner container centrally of the outer container.

5. A suspending device for the inner container of an insulated container and wherein said inner container is centrally suspended within an outer container, the combination with said inner container having a centrally apertured neck with an integral radial flange radially outwardly of said inner container neck, of an upper and a lower clamping member adapted to be telescoped relative to one another and each including a body portion extending in parallelism centrally apertured to have extended therethrough the said inner container neck, said lower clamping member central aperture in one direction having a dimension to permit the radial flange to initially pass therethrough, and said clamping members body portions respectively above and below the neck radial flange clamping the same upon the telescoping thereof, means associated with said telescoping members for attaching the same to the outer container for suspending the inner container centrally of the outer container, and compressible shock absorbing means between the radial flange and the overlying portions of the said clamping members body portions.

6. A suspending device for the inner container of an insulated container and wherein said inner container is centrally suspended within an outer container, the combination with said inner container having a centrally apertured neck with an integral radial flange radially outwardly of said inner container neck, of an upper and a lower clamping member adapted to be telescoped relative to one another and each including a body portion extending in parallelism centrally apertured to have extended therethrough the said inner container neck, said lower clamping member central aperture in one direction having a dimension to permit the radial flange to initially pass therethrough, and said clamping members body portions respectively above and below the neck radial flange clamping the same upon the telescoping thereof, means associated with said telescoping members for attaching the same to the outer container for suspending the inner container centrally of the outer container, compressible shock absorbing means between the radial flange and the overlying portions of the said clamping members body portions, said inner container neck upwardly of the telescopic members being exteriorly threaded, and a closure cap removably secured to said neck through its thread for closing the central aperture thereof.

7. A suspending device for the inner container of an insulated container and wherein said inner container is centrally suspended within an outer container, the combination with said inner container having a centrally apertured neck with an integral radial flange radially outwardly of said inner container neck, of an upper and a lower clamping member each including a body portion extending in parallelism, each body portion being centrally apertured to have extended therethrough the said inner container neck, said lower clamping member body portion aperture in one direction having a dimension to permit the inner container radial flange to be passed therethrough, and said clamping members body portions, respectively, outwardly of the apertures being located above and below the neck radial flange and with the major portion of said clamping members body portions immediately adjacent to and circumferentially of their apertures having clamped therebetween said inner container radial flange, a downwardly projecting skirt from the periphery of said upper clamping member body portion, an upwardly projecting wall from the periphery of said lower clamping member body portion, said upper clamping member skirt and said lower clamping member wall, respectively, having dimensions that said skirt may be slidingly telescoped within the wall to effect the clamping of the inner container radial flange between the said upper and lower clamping members body portions, and said lower clamping member wall having an external dimension to be slidingly telescoped within the outer container.

8. A suspending device for the inner container of an insulated container and wherein said inner container is centrally suspended within an outer container, the combination with said inner container having a centrally apertured neck with a radial flange radially outwardly of said inner container neck, of an upper and a lower clamping member each including a body portion extending in parallelism, each body portion being centrally apertured to have extended therethrough the said inner container neck, said lower clamping member body portion aperture being adapted to have the inner container radial flange passed therethrough, and said clamping members body portions, respectively, outwardly of the apertures being located above and below the neck radial flange and with the major portion of said clamping members body portions immediately adjacent to and circumferentially of their apertures having clamped therebetween said inner container radial flange, a downwardly projecting skirt from the periphery of said upper clamping member body portion, an upwardly projecting wall from the periphery of said lower clamping member body portion, said upper clamping member skirt and said lower clamping member wall, respectively, having dimensions that said skirt may be slidingly telescoped within the wall to effect the clamping of the inner container radial flange between the said upper and lower clamping members body portions, said lower clamping member wall having an external dimension to be slidingly telescoped within the outer container, and compressible shock absorbing means between the radial flange and the clamping portions of the said clamping members body portions.

9. A suspending device for the inner container of an insulated container and wherein said container is centrally suspended within an outer container, the combination with said inner container having a centrally apertured neck with a radial flange radially outwardly of said inner container neck, of an upper and a lower clamping member each including a body portion extending in parallelism, each body portion being centrally apertured to have extended therethrough the said inner container neck, said lower clamping member body portion aperture being adapted to have the inner container radial flange passed therethrough, and said clamping members body portions, respectively, outwardly of the apertures being located above and below the neck radial flange and with the major portion of said clamping members body portions immediately adjacent to and circumferentially of their apertures having clamped therebetween said inner container radial flange, a downwardly projecting skirt from the periphery of said upper clamping member body portion, an upwardly projecting wall from the periphery of said lower clamping member body portion, said upper clamping member skirt and said lower clamping member wall, respectively, having dimensions that said skirt may be slidingly telescoped within the wall to effect the clamping of the inner container radial flange between the said upper and lower clamping members body portions, said lower clamping member wall having an external dimension to be slidingly telescoped within the outer container, compressible shock absorbing means between the radial flange and the clamping portions of the said clamping members body portions, said inner container neck upwardly of the telescoped clamping members being exteriorly threaded, and a closure cap removably secured to said neck through its thread for closing the central aperture thereof.

References Cited in the file of this patent

UNITED STATES PATENTS

| | | |
|---|---|---|
| 1,497,764 | Simonson et al. | June 17, 1924 |
| 2,163,056 | Payson et al. | June 20, 1939 |
| 2,480,247 | Jamison et al. | Aug. 30, 1949 |
| 2,695,719 | Faris | Nov. 30, 1954 |

FOREIGN PATENTS

| | | |
|---|---|---|
| 496,481 | Germany | Apr. 24, 1930 |
| 946,717 | France | Dec. 27, 1948 |